(12) United States Patent
Wood et al.

(10) Patent No.: US 7,664,798 B2
(45) Date of Patent: Feb. 16, 2010

(54) DATABASE PERFORMANCE BASELINES

(75) Inventors: Graham Stephen Wood, El Granada, CA (US); Alex Tsukerman, Foster City, CA (US); Richard Sarwal, Portola Valley, CA (US); Gary Ngai, Saratoga, CA (US); Mark Ramacher, San Carlos, CA (US); Leng Leng Tan, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 448 days.

(21) Appl. No.: 10/934,345

(22) Filed: Sep. 3, 2004

(65) Prior Publication Data

US 2005/0086246 A1    Apr. 21, 2005

Related U.S. Application Data

(60) Provisional application No. 60/500,869, filed on Sep. 4, 2003.

(51) Int. Cl.
*G07F 17/30* (2006.01)

(52) U.S. Cl. .................. 707/205; 707/200; 707/203; 712/1; 709/217; 709/223; 709/238; 709/201

(58) Field of Classification Search .............. 707/200, 707/203, 205
See application file for complete search history.

(56) References Cited

U.S. PATENT DOCUMENTS

| | | | |
|---|---|---|---|
| 2,883,255 | A | 4/1959 | Anderson |
| 3,324,458 | A | 6/1967 | MacArthur |
| 3,344,408 | A | 9/1967 | Singer et al. |
| 3,351,910 | A | 11/1967 | Miller et al. |
| 4,654,806 | A | 3/1987 | Poyser et al. |
| 4,849,879 | A | 7/1989 | Chinnaswamy et al. |
| 4,994,986 | A | 2/1991 | Cihiwsky et al. |
| 5,303,166 | A | 4/1994 | Amalifitano et al. |
| 5,349,662 | A | 9/1994 | Johnson et al. |
| 5,488,648 | A | 1/1996 | Womble |

(Continued)

FOREIGN PATENT DOCUMENTS

JP    55091036 A    7/1980

(Continued)

OTHER PUBLICATIONS

Chaudhuri, Surajit "Self-Managing DBMS Technology at Microsoft," Microsoft Research, Sep. 1, 2004, 35 pages.

(Continued)

*Primary Examiner*—Neveen Abel Jalil
*Assistant Examiner*—Farhan M Syed
(74) *Attorney, Agent, or Firm*—Townsend and Townsend and Crew LLP

(57) ABSTRACT

Systems and methods to define and store performance baselines. A baseline may be defined as a pair of snapshots, each snapshot containing the same set of statistics and having a timestamp value associated therewith. The present invention allows for the designation, automatically or manually, of statistics collected over a certain period of time to be stored and used for comparison. Baselines may be used, for example, to manually or automatically compare with current system performance, compare difference-difference values and set thresholds to monitor current system performance.

25 Claims, 2 Drawing Sheets

U.S. PATENT DOCUMENTS

| | | | |
|---|---|---|---|
| 5,729,736 A | | 3/1998 | Gomi et al. |
| 5,734,884 A | | 3/1998 | Eberhard et al. |
| 5,778,350 A | | 7/1998 | Adams et al. |
| 5,781,703 A | | 7/1998 | Desai et al. |
| 5,796,633 A | | 8/1998 | Burgess et al. |
| 5,872,976 A | | 2/1999 | Yee et al. |
| 5,905,868 A | | 5/1999 | Baghai et al. |
| 5,960,423 A | | 9/1999 | Chaudhuri et al. |
| 6,003,022 A | | 12/1999 | Eberhard et al. |
| 6,029,163 A | | 2/2000 | Ziauddin |
| 6,035,306 A | * | 3/2000 | Lowenthal et al. ......... 707/200 |
| 6,052,694 A | | 4/2000 | Bromberg |
| 6,223,171 B1 | | 4/2001 | Chaudhuri et al. |
| 6,282,570 B1 | | 8/2001 | Leung et al. |
| 6,311,175 B1 | | 10/2001 | Adriaans et al. |
| 6,363,282 B1 | | 3/2002 | Nichols et al. |
| 6,389,430 B1 | | 5/2002 | Parker |
| 6,434,714 B1 | | 8/2002 | Lewis et al. |
| 6,467,052 B1 | | 10/2002 | Kaler et al. |
| 6,510,419 B1 | | 1/2003 | Gatto |
| 6,553,369 B1 | | 4/2003 | Guay et al. |
| 6,615,222 B2 | | 9/2003 | Hornibrook et al. |
| 6,665,815 B1 | * | 12/2003 | Goldstein et al. ............ 714/20 |
| 6,671,830 B2 | | 12/2003 | Kaler et al. |
| 6,691,254 B2 | | 2/2004 | Kaler et al. |
| 6,766,318 B1 | | 7/2004 | Guay et al. |
| 6,775,676 B1 | | 8/2004 | Briam et al. |
| 6,792,460 B2 | | 9/2004 | Oulu et al. |
| 6,801,903 B2 | | 10/2004 | Brown et al. |
| 6,804,627 B1 | * | 10/2004 | Marokhovsky et al. ...... 702/182 |
| 6,901,582 B1 | | 5/2005 | Harrison |
| 6,952,692 B1 | | 10/2005 | Bhattiprolu et al. |
| 6,954,717 B2 | | 10/2005 | Boldt et al. |
| 6,955,302 B2 | | 10/2005 | Erdman, Jr. |
| 6,983,257 B2 | | 1/2006 | Gatto |
| 7,051,013 B2 | | 5/2006 | Horman et al. |
| 7,085,786 B2 | | 8/2006 | Carlson et al. |
| 7,089,347 B2 | | 8/2006 | Mogi et al. |
| 7,093,169 B2 | | 8/2006 | Merriam |
| 7,139,749 B2 | | 11/2006 | Bossman et al. |
| 7,292,961 B2 | | 11/2007 | Dias et al. |
| 7,376,682 B2 | | 5/2008 | Ramacher et al. |
| 2002/0065833 A1 | | 5/2002 | Litvin |
| 2002/0087587 A1 | * | 7/2002 | Vos et al. ................... 707/203 |
| 2002/0091708 A1 | | 7/2002 | Vos et al. |
| 2002/0173997 A1 | | 11/2002 | Menard et al. |
| 2002/0178416 A1 | | 11/2002 | Chen et al. |
| 2003/0120620 A1 | | 6/2003 | Fromherz et al. |
| 2004/0044500 A1 | | 3/2004 | Lu |
| 2004/0044700 A1 | | 3/2004 | Fisher et al. |
| 2004/0059704 A1 | | 3/2004 | Hellerstein et al. |
| 2004/0064544 A1 | | 4/2004 | Barsness et al. |
| 2004/0098265 A1 | | 5/2004 | Kelly et al. |
| 2005/0055673 A1 | | 3/2005 | Dias et al. |
| 2005/0086195 A1 | | 4/2005 | Tan et al. |
| 2005/0086246 A1 | | 4/2005 | Wood et al. |
| 2005/0086263 A1 | | 4/2005 | Ngai et al. |
| 2005/0103874 A1 | | 5/2005 | Erdman, Jr. |
| 2005/0278381 A1 | | 12/2005 | Diao et al. |
| 2006/0218450 A1 | | 9/2006 | Malik et al. |
| 2007/0022192 A1 | | 1/2007 | Nguyen et al. |

FOREIGN PATENT DOCUMENTS

| | | |
|---|---|---|
| JP | 02-232795 | 9/1990 |
| WO | WO 02/06949 A2 | 1/2002 |
| WO | WO 02/37061 A1 | 3/2002 |

OTHER PUBLICATIONS

Doppelhammer et al. "Database Performance in the Real World—TPC-D and SAP R/3—," ACM, 1997, pp. 123-134.

Hagmann et al. "Performance Analysis of Several Back-End Database Architectures," ACM, 1986, vol. 11, No. 1, pp. 1-26.

IBM Technical Disclosure Bulletin, "Software Monitor for Performance Tuning a Virtual Memory Computer System," 1973, vol. 15, Issue No. 12. pp. 3730-3733.

Lightsone et al. "Toward Autonomic Computing with DB2 Universal Database," Sigmod Record, 2002, vol. 31, No. 3, pp. 55-61.

Lightstone et al. "Autonomic Computing for Relational Databases: The Ten-Year Vision," IEEE, 2003, pp. 419-424.

Lohman et al "Smart: Making DB2 (More) Autonomic," Proceedings of the 28$^{th}$ VLDB Conference, Hong Kong, China, 2002, 3 pages.

Ryu et al. "Analysis of Database Performance with Dynamic Locking," Journal of the Associates for Computing Machinery, 1990, vol. 37, No. 3, pp. 491-523.

Stonebraker, Michael et al. "Performance Enhancements to a Relational Database System," ACM Transactions on Database Systems, 1983, vol. 8, No. 2, pp. 167-185.

* cited by examiner ously and specifically collect data to be used for comparison before a workload run, execute the workload run and then manually compare the data, e.g., compute differences in rates of change or differences in accumulated values.

DATABASE PERFORMANCE BASELINES

CROSS-REFERENCES TO RELATED APPLICATIONS

This application is a non-provisional of U.S. Provisional Application Ser. No. 60/500,869, filed Sep. 4, 2003, the contents of which are hereby incorporated by reference.

BACKGROUND OF THE INVENTION

The present invention relates generally to database management, and more particularly to the collection and analysis of database statistics.

For most database systems, the tasks of performance monitoring and tuning of the database requires the use of sophisticated tools to collect information and analyze the performance of the database system during the execution of a workload. Such methods can often be costly and inefficient to database users. Database performance is typically characterized by the cumulative amount of time users spend waiting for the database server to respond to their requests. System performance statistics are commonly needed for analysis when a problem has been reported to the administrator of the database system. For example, users may experience unsatisfactory response time while browsing web pages that require fetching data from the database. Each problem could have numerous potential causes, such as, for example, an undersized buffer cache, a badly written application or SQL, bad SQL plans due to stale optimizer statistics, etc.

Collecting performance-related data after the fact may sometimes produce fruitless results, as some problems are timing related. This is analogous to taking pictures of a crime scene to catch a criminal after the crime has been committed. Also, existing mechanisms to collect system data are generally difficult to develop and maintain as they involve data selection, storage, analysis, and the disposal of old data in order to free up space for future data collection. This usually incurs extra cost to database customers as they have to purchase sophisticated monitoring tools from third party vendors, as well as hire experienced database administrators to run these tools for monitoring and tuning purposes.

Collecting the right set of performance data is one key to identifying the most sever bottlenecks in the system. For example, under-collecting performance data may cause self-tuning advisors to provide the wrong recommendations or may result in undertaking incorrect remedies. Over-collecting performance data, on the other hand, may result in wasted system resources (e.g., storage space and processor usage) and in an unnecessarily large amount of analysis time.

Once statistical data is collected, it is useful to provide efficient mechanisms to compare stored data with data representing current performance. In the past, users were forced to manually and specifically collect data to be used for comparison before a workload run, execute the workload run and then manually compare the data, e.g., compute differences in rates of change or differences in accumulated values.

Accordingly, it is desirable to provide systems and methods that track and store performance-related information in a database system. Such systems should also provide a useful mechanism for generating and storing performance baselines to allow for an efficient comparison of current database performance to database performance from a time period in the past.

BRIEF SUMMARY OF THE INVENTION

The present invention provides systems and methods to define and store performance baselines. According to the present invention, a baseline is defined as a pair of snapshots, each snapshot containing the same set of statistics and having a timestamp value associated therewith. The present invention allows for the designation, automatically or manually, of statistics collected over a certain period of time to be stored and used for comparison. Baselines may be used, for example, to manually or automatically compare with current system performance, compare difference-difference values and set thresholds to monitor current system performance.

According to an aspect of the present invention, a computer implemented method is provided for defining a statistics baseline in a database system. The method typically includes storing two or more snapshots to the database, each snapshot comprising a plurality of database performance statistics taken at a specific point in time different in time from the other snapshots, and receiving a selection of a first one of said snapshots having a first snapshot time and a second one of the snapshots having a second snapshot time, wherein the first and second snapshots define a first baseline, the first baseline having a time period associated therewith, the time period being the difference between the first and second snapshot times. The method also typically includes storing a first baseline object to the database, the first baseline object including a first identifier that identifies the first snapshot and a second identifier that identifies the second snapshot.

According to another aspect of the present invention, a computer-readable medium is provided that includes code for controlling a database system to collect performance statistics in the database system. The code typically includes instructions to store two or more snapshots to the database, each snapshot comprising a plurality of database performance statistics taken at a specific point in time different in time from the other snapshots, and receive a selection of a first one of said snapshots having a first snapshot time and a second one of the snapshots having a second snapshot time, wherein the first and second snapshots define a first baseline, the first baseline having a time period associated therewith, the time period being the difference between the first and second snapshot times. The code also typically includes instructions to store a first baseline object to the database, the first baseline object including a first identifier that identifies the first snapshot and a second identifier that identifies the second snapshot.

According to yet another aspect of the present invention, a database system is provided that typically includes a database for storing data objects, a process space, a database management process executing in the process space, the management process configured to access the data objects responsive to client requests, and a system process executing in the process space. The system process is typically configured to store two or more snapshots to the database, each snapshot comprising a plurality of database performance statistics taken at a specific point in time different in time from the other snapshots, and to receive a selection of a first one of said snapshots having a first snapshot time and a second one of said snapshots having a second snapshot time, wherein the first and second snapshots define a first baseline, the first baseline having a time period associated therewith, the time period being the difference between the first and second snapshot times. The system process is also typically configured to store a first baseline object to the database, the first baseline object including a first identifier that identifies the first snapshot and a second identifier that identifies the second snapshot.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
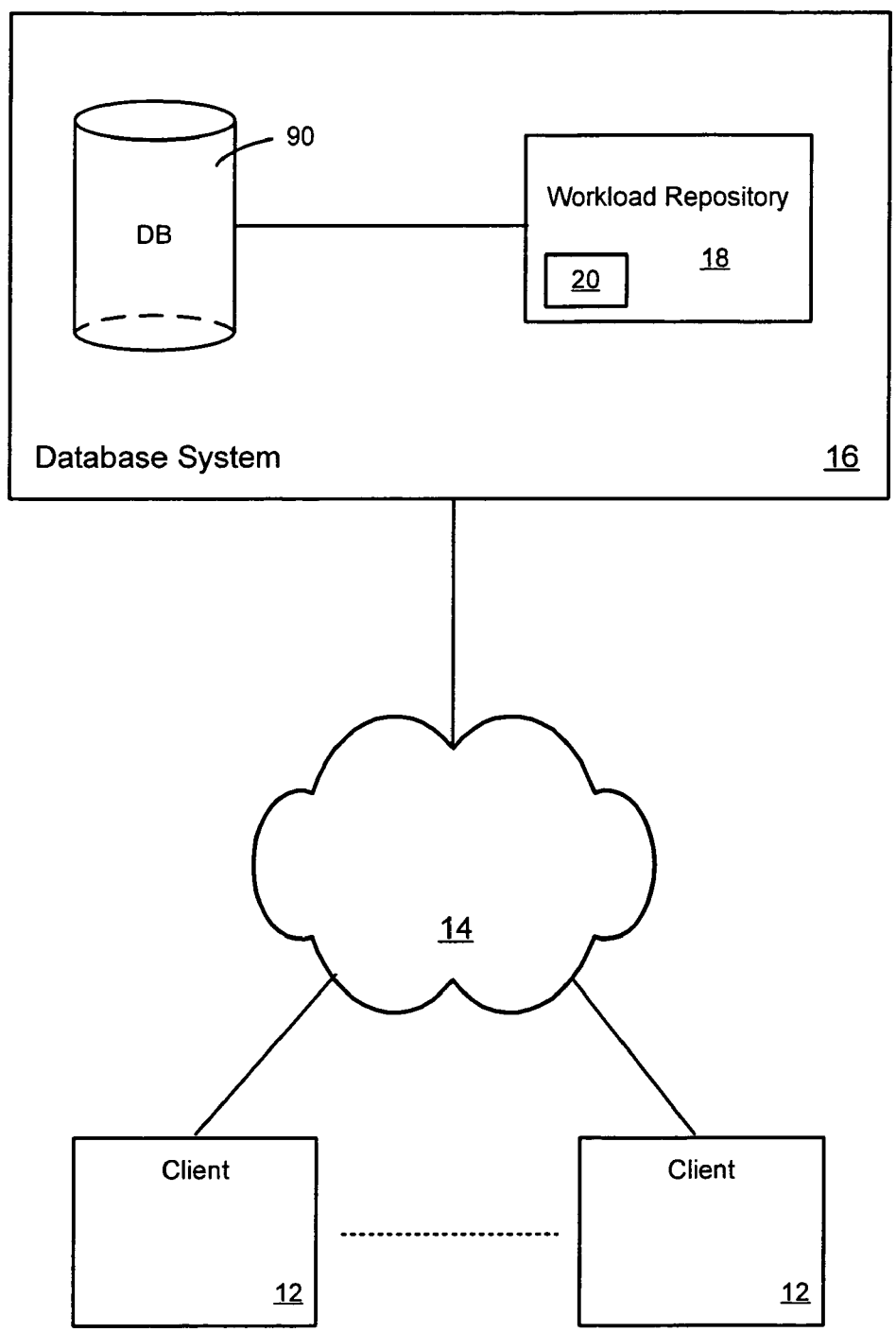
FIG. 1 illustrates a database system wherein an automatic workload repository system framework according to the present invention might be used.

The present invention provides systems and methods to automatically capture, store and manage database statistics data, including systems and methods to generate statistics baselines for a particular time period.

General Overview

The present invention provides, in one aspect, a workload repository (WR) module that automatically collects and stores database performance statistics. Collecting historical database statistics data is useful to allow analysis of performance problems that occurred in a previous period. Many performance problems are intermittent. Many times when a problem is reported, the problem is no longer happening. If the system has a record of what was going on in the system, it is typically much easier to identify the problems that caused the slowdown. Collecting historical database statistics data is also useful to use as a baseline for comparison with the current performance of the system. As workload changes, such comparisons are useful for identifying and predicting potential bottlenecks in the system. For example, baseline data may be used to compare current system performance against a time period when database performance was determined to be optimal.

Accordingly, the workload repository (WR) includes, in one aspect, a collection of persistent system performance statistics that may be used by internal clients, such as Advisory modules, for self-tuning and that is accessible by external clients and users. The collected statistics data is stored in a system-defined WR schema.

In one aspect, the WR maintains a schedule of capture times at which the system will automatically capture statistics that reflect the activities of the system up to the capture time. By regularly capturing such statistics, system monitoring and tuning advisors are able to use such statistics to automatically perform analysis for any time interval within which performance data is available. In one aspect, the capturing period is set to a default time interval, such as 60-minutes, but may be adjusted. To be totally self-managed, the WR in one aspect also provides an automatic mechanism to periodically purge data that has become obsolete. This purging of data is automatically done based on a regular schedule, e.g., a user-configurable period, defaulting to 7 days.

For statistics data whose volume varies based on the size of the system, the WR is configured in one aspect to only collect data that belongs to the (top) most active set of entities (potential bottlenecks). For example, performance data for SQL executions are collected only on the most active, e.g., 20 or 30, SQL statements based on criteria such as elapsed and cpu times. By limiting such collections, the WR is able to guarantee a relatively predictable space consumption, as well as a predictable amount of time needed for data analysis, without sacrificing the ability of the captured performance data to be used for identifying bottlenecks. U.S. Non-provisional application Ser. No. 10/934,344, entitled "Automatic Workload Repository Battery of Performance Statistics", filed on even date herewith, the contents of which are hereby incorporated by reference, discusses additional aspects and features of statistics collected by AWR.

In preferred aspects, the workload repository provides support for managing snapshots and baselines, which includes their creation and deletion, as well as the retention and comparisons of data using snapshots and baselines. A snapshot is a collection of database performance statistics that are captured at a certain point in time. For cumulative statistics, data from two snapshots can be used for computing changes (deltas) in the statistics during that period of time. Such deltas can be used to obtain rates of changes. For example, the number of buffer gets per second between 3 PM and 4 PM may be determined using snapshots taken at those two points in time. A baseline is a set of statistics representing performance over a defined time period in the past. In one aspect, a baseline can be defined as a pair of snapshots. Users may set up baselines from some representative periods in the past to be used for comparisons with the current system behavior.

System Framework Architecture

FIG. 1 illustrates a database system 16 wherein a system 18 for collecting database performance statistics, such as an automatic workload repository system framework, might be used. As illustrated in FIG. 1 any user systems 12 might interact via a network 14 with database system 16. The users of those user systems 12 might be users in differing capacities and the capacity of a particular user system 12 might be entirely determined by the current user. For example, where a developer is using a particular user system 12 to interact with database system 16, that user system has the capacities allotted to that developer. However, while an administrator (e.g., DBA) is using that user system to interact with system 16, it has the capacities allotted to that administrator. System 16 also includes, in one aspect, a separate storage module (not shown), such as one or more hard disks for storing collected statistics and other data.

In one aspect, an enterprise management ("EM"; not shown) module is provided to expose the workload repository and other internal and external clients to an external user. For example, the EM provides, in one aspect, a graphical user interface (GUI) that allows a user to interact with the workload repository and various internal and external client modules. Thus, in one aspect, an external client such as a database administrator, using a browser on client system 12, may interact with a GUI module (e.g., enterprise management module) to access data and to view reports generated using workload repository 18.

Network 14 can be a LAN (local area network), WAN (wide area network), wireless network, point-to-point network, star network, token ring network, hub network, or other configuration. One of the most common type of network in current use is a TCP/IP (Transfer Control Protocol and Internet Protocol) network such as the global internetwork of networks often referred to as the "Internet" with a capital "I". For example, user systems 12 might communicate with system 16 using TCP/IP and, at a higher network level, use other common Internet protocols to communicate, such as HTTP, FTP, AFS, WAP, etc.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs a client interface module, such as an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., DBA) of user system 12 to access, process and view information and pages available to it from system 16 over network 14. Each user system 12 also typically includes one or more user interface devices, such as a keyboard, a mouse, touch screen, pen or the like, for interacting with a graphical user interface (GUI) provided on a display (e.g., monitor screen, LCD display, etc.) in conjunction with pages, forms and other information provided by system 16 or other systems or servers. The client interface module of system 12 typically implements or interfaces with a server module (not shown, but may be referred to herein as an Enterprise Management module) configured to create web pages for display on client 12 in response to requests from client 12. As discussed above, the present invention is suitable for use with any type of network such as the Internet, an intranet, an extranet, a virtual private network (VPN), a non-TCP/IP based network, any LAN or WAN or the like.

According to one embodiment, each user system 12 and all of its components are operator configurable using applications, including computer code run using a central processing unit such as an Intel Pentium processor or the like. Similarly, database system 16 and all of its components might be operator configurable using application(s) including computer code run using a central processing unit such as an Intel Pentium processor or the like, or multiple processor units. Computer code for operating and configuring database system 16 to intercommunicate and to process and store tables, pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, or any other scripting language, such as VBScript, Perl, Python, or TCL.

According to one embodiment, system 16 includes a database 90 for storing objects and data according to various object schema. For example, database 90 typically stores data created and used by an enterprise. In one embodiment, database 90 is a relational database, and database system 16 implements a database server management application (e.g., Oracle 9i or 10g) adapted to store, update and retrieve data based on SQL-formatted and other types of commands. If more than one database system is used, they may be located in close proximity to one another (e.g., in a server farm located in a single building or campus), or they may be distributed at locations remote from one another (e.g., one or more servers located in city A and one or more servers located in city B). The system 16, in one aspect, could be implemented in a standalone system with an associated data storage repository or database, or it could include one or more logically and/or physically connected servers distributed locally or across one or more geographic locations. Additionally, the term "server" is meant to include a computer system, including processing hardware and process space(s), and an associated database storage system and database server application (e.g., Oracle RDBMS such as Oracle 9i or 10g) as is well known in the art. It should also be understood that "server system" and "server" may be used interchangeably herein. Similarly, the databases described herein can be implemented as single databases, a distributed database, a collection of distributed databases, a database with redundant online or offline backups or other redundancies, etc., and might include a distributed database or storage network and associated processing intelligence. The database may also be implemented in a clustered environment.

In one aspect, a variety of internal database clients may interact with, and access information and statistics data collected and stored in, the workload repository 18. Internal clients might include internal database tuning advisory modules such as a SQL advisory, an Object Advisory and others. Another internal client might include an Automatic Database Diagnostic Monitor (ADDM). Various aspects of such internal database client modules and others can be found in U.S. Non-provisional application Ser. No. 10/775,513, entitled "The Time Model", filed Feb. 9, 2004; U.S. Non-provisional application Ser. No. 10/775,733, entitled "Capturing Session Activity as In-Memory Snapshots Using a Time-Based Sampling Technique Within a Database for Performance Tuning and Problem Diagnosis", filed Feb. 9, 2004; U.S. Non-provisional application Ser. No. 10/775,531, entitled "Automatic Database Diagnostic Monitor Architecture", filed Feb. 9, 2004; U.S. Provisional Application Ser. No. 60/500,869, entitled "Self Managing Database Architecture", filed Sep. 4, 2003; and U.S. Provisional Application Ser. No. 60/500,864, entitled "Automatic Database Diagnostic Monitor Architecture", filed Sep. 5, 2003, the contents of which are hereby incorporated by reference. The various Advisory modules described in these applications use the collected statistics stored in the AWR to perform self-monitoring and advice generation functions in an autonomous, proactive manner. For example, using baselines as a threshold for current performance, an early warning server generated alert may be issued by an Alert Generation module when current performance exceeds a selected baseline measurement.

Workload Repository Schema

Figure 2:
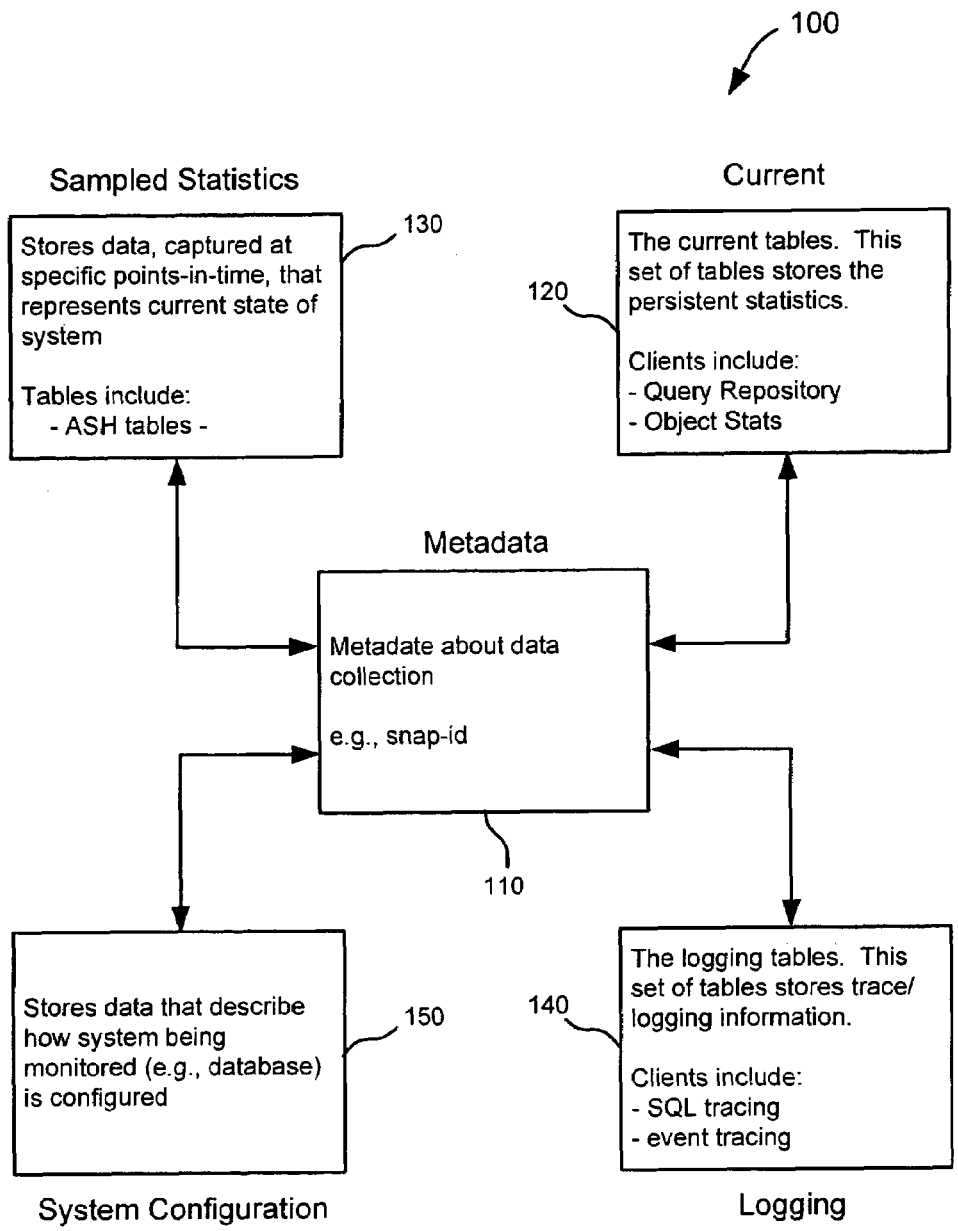
FIG. 2 illustrates a workload repository schema according to one embodiment of the present invention.

FIG. 2 illustrates a workload repository schema 100 according to one embodiment of the present invention. As shown, in one aspect, schema 16 includes four types of WR tables. Metadata 110, is used to tie the WR tables together. For example, in one embodiment as will be described in more detail below, a snaphot_id, or snap_id is used to tie entries in the WR tables together. The current tables 120 and sampled statistics tables 130 store statistical information about the database. The logging tables 140 provide generic logging and tracing capabilities to clients of the database server. System configuration tables 150 provide support for internal infrastructure (e.g., RDBMS components) clients. Referring back to FIG. 1, in one embodiment, schema 100 including the statistics and data are stored in tablespace 20 of WR 18. Tablespace 20 itself is stored in the database. A background process executing in database system 16 runs various tasks to retrieve statistics from database 90, store retrieved statistics to schema 100, and execute processing tasks, such as purging and metric computation as will be described later.

Sampled statistics tables 130 contain a history of performance statistics data. They contain samples collected in memory since the last snapshot time by sampling components such as a metrics component (e.g., metrics are calculated every minute) and ASH (e.g., samples active sessions every second). System configuration tables 150 provide configuration information about the database (e.g., configuration parameter settings, software version, disk space, number of CPUs, etc.) captured during snapshots to be used and analyzed by auto tuning advisors.

Current tables 120 store the latest set of statistics that was transferred from memory to disk, e.g., the current values of statistics at each snapshot time. Storing a current, persistent on-disk copy of in-memory statistics allows statistics to survive instance crashes. If an instance unexpectedly crashes, these current statistics can be loaded from disk into memory once the instance restarts. Also, current tables can be used for memory overflow in case virtual memory is needed for a particular set of statistics.

Logging tables 140 are used for logging data and tracing information. An example of a client for this type of table is SQL trace. Clients use a system-defined API that allows them to write logging and tracing information into the workload repository in an efficient manner. The method of collecting the trace information into the logging tables is transparent to the user. The user may control the logging of data through ON/OFF parameters. Entries in logging tables 140 are typically not tied to snapshots, although entries may be correlated by timestamps to snapshots Co-pending U.S. Non-provisional application Ser. No. 10/934,771, entitled "Automatic Workload Repository the Self-Managing Performance Statistics Collection Infrastructure", filed on even date herewith discloses additional aspects and features of the AWR and is hereby incorporated by reference in its entirety.

Snapshots

A snapshot is a set of history of performance statistics captured in the workload repository at a certain time in the past. The most common source of data comes from in memory performance statistics available by reading memory directly or through SQL type APIs. The most common use of snapshots is for computing the rate of change of a statistic over a period of time and using it for performance analysis. In such cases, the changes in values between two snapshots may be computed using the cumulative values at the begin and end snapshots of the time period. For example, the average number of physical reads of the system between a time period may be determined by using the physical_reads statistics in a buffer pool statistics table.

Many statistics are tracked using cumulative totals. For example, the physical_reads statistics tracks the total number of physical_reads since the start of an instance. In certain aspects, the changes, or delta values, of some statistics are tracked. For example, for SQL statements delta values for parse calls, elapsed time, and other statistics are tracked.

Each snapshot is preferably identified by a snapshot sequence number (snap_id) that is unique within the workload repository. For example, in one aspect, each row in the Sampled statistics tables 130 is tagged with a snapshot_id, which represents the time when the data is captured to disk. A snapshot metadata table stores the mapping between the snapshot_id and the actual wall-clock time.

The sampled statistics tables 130, in one aspect, are organized into the following categories:
1. File Statistics
2. General System Statistics
3. Concurrency Statistics
4. Instance Tuning Statistics
5. SQL Statistics
6. Segment Statistics
7. Undo Statistics
8. Time Model Statistics
9. Recovery Statistics Snapshots can be generated automatically and manually. For statistics that track delta values, the deltas are computed for the period between the last snapshot and the current snapshot. The workload repository preferably does not differentiate between manual or automatically generated snapshots. The system may be analyzed using any pair of snapshots.

Users can control the set of statistics to capture by using a STATISTICS-LEVEL parameter that determines the type and amount of statistics that will be captured. Such a parameter may range from Off indicating that no statistics will be captured to ALL indicating that the entire set of statistics types stored in WR will be collected, and one or more various levels in between indicating that a subset of all statistics types will be collected.

In a clustered database environment (multiple database engines on multiple machines with shared access to a single set of database files), each snapshot captures data from the entire database cluster. In one aspect, each snapshot captures data from all clustered database nodes in the same cluster. To make sure snapshots capture information that describes the cluster with respect to a certain point in time, data from each node is retrieved at around the same wallclock time, and is tagged with the same snapshot id. In another aspect, captured data is stored separately for each individual cluster database node, and is tagged with a unique id. For example, the buffer_busy_wait statistics shows the number of buffer waits on each individual node.

U.S. Non-provisional application Ser. No. 10/934,344, entitled "Automatic Workload Repository Battery of Performance Statistics", filed on even date herewith, discusses additional features of snapshots, including, for example, querying snapshot tables, purging snapshots and efficient techniques for storing information such as file names, statistic names, and SQL text related to captured snapshots.

Baselines

As mentioned above, a baseline is defined as a pair of snapshots of the internal operational statistics of the system. In one aspect, a user, e.g., DBA, may define a baseline by selecting two snapshots that define the time period for which a later comparison with current system performance may be desired. In one aspect, for example, a procedure is provided that allows a user to define a baseline on a pair of snap ids. The procedure accepts a beginning snap id and an end snap id as input and creates the snapshot baseline. A baseline name variable may be provided by the user to uniquely identify the baseline, or a name or key may be automatically generated to uniquely identify the baseline object.

Advantageously, a user may designate any baseline time period desired for comparison with current statistics by selecting two snapshots having the desired time difference and desired starting time. A user may manually designate a baseline time period, in one aspect, by selecting the appropriate snapshots, e.g., based on the snapshot timestamp. For example, a user may designate consecutive snapshots to define a baseline—where the 60 minute default snapshot generation is active, the baseline would define a 60 minute interval. A baseline may represent any period of time such as, for example, an hour, a day, a week, a month or quarter or an subset or superset, thereof. The user may also define multiple baselines. The presence of multiple baselines allows comparisons to be made based on the same time period from a previous baseline day, week, month, quarter, etc., and allows for a more robust view of system performance.

In another aspect, a user may set a schedule to automatically capture one or more baselines. In this aspect, the user identifies the appropriate time period(s) for which a baseline capture event is desired. For example, using a GUI, a user may designate that a baseline be captured for every Monday between the hours of 9:00 AM and 10:00 AM and that another baseline be captured for every Monday between the hours of 9:00 AM and 12:00 AM. The system would then automatically generate and store a first baseline object for each Monday using the snapshots taken at 9:00 AM and 10:00 AM on that Monday, and a second baseline object for each Monday using the snapshots taken at 9:00 AM and 12:00 AM on that Monday. The system automatically determines the snapshot_ids needed for generating a baseline. For example, using the user-designated times, the system performs a lookup using the mapping between the snapshot_id and wall clock time in the snapshot metadata. In general, a user may schedule any number of baseline creation events as desired. In this manner, a family of baselines may be automatically created. For example, a user may designate that baselines be created for each distinct hour of a day, or for each day of a week, or for each particular day of the week for a month or year.

In one implementation, a defined baseline object is stored as raw snapshot data that is preserved in the same tables (or replicated tables) so that it can support all functionality that snapshot raw data can support. This data is not deleted from the system as long as the baseline is defined. In yet another implementation the baseline object is stored as computed values over the snapshot data to be used for functionality specific to baseline comparison. For example, the max or average values of metrics over the baseline period could be stored as a computed baseline.

A baseline is useful for comparing with current system performance, and may be used by internal and external clients. For example, baselines may be used by internal client modules to derive thresholds to monitor system performance and generate alerts when system performance exceeds a threshold derived from a baseline. In one aspect, a user may identify one or more performance parameters or statistics in a baseline to be compared with current system performance on a regular, on-going basis or as a one-time occurrence. A user may select one or more or all statistics that make up a baseline for use in comparing with system performance. If the selected statistics, when compared with current statistics taken over a current, similar time period, exceed some threshold metric, then an alert may be generated.

Top N SQL Statistics

SQL statistics are one of the most important kind of statistics used for performance analysis. Since there are usually a large number of SQL statements in the shared SQL cache, efficient capturing of SQL statistics can become tricky. If everything in the shared SQL cache is blindly captured, the amount of information captured can be unnecessarily large. For example, in a large system, the shared SQL cache can hold more than 20,000 SQL statements. Drawbacks to such an approach include taking a long time to flush and taking up a large amount of disk space.

In one aspect, to reduce the volume of captured data, only the top consumers are captured based on several criteria. Using delta values maintained between snapshots, the top set of SQL statements by any criteria can be determined by a single pass of the SQL statistics values. The delta values for SQL statistics are made available by saving the current values of statistics to memory when a snapshot occurs, and then subtracting the current from the saved value when the next snapshot occurs. For efficiency, the statistics as of the last snapshot for a given SQL statement are saved on the first execution of a SQL statement after the snapshot occurs. Any SQL statement without saved values since the last snapshot is assumed to have 0 delta values for all statistics.

Top N Segment Statistics

TopN segment statistics are captured in ways similar to SQL statistics. Examples of segment statistics for capture include:

unused space,
number of buffers in cache,
number of rows, and
full table scans.

Additional statistics useful for Object Space Advisories include:

space used (deltas in bytes),
space allocated (deltas in bytes),
row piece access count,
non-head piece access count, and
non-tail row piece access count where row piece size <½ maximum row pick size for block.

Active Session History/Sampled Data

In one aspect, Active Session History (ASH) data is stored persistently in the WR. ASH data is particularly useful for the ADDM. While the snapshot data provides an overview of how the system is performing, the WR-ASH data provides detailed drill-down information. The snapshot data combined with the ASH data provides a complete picture of the system. Flushing shapshots and ASH data for the same time period allows the users to see a more complete picture.

Unlike regular snapshot data, the WR-ASH data is not directly tied to specific snapshots. Instead data is collected at much smaller time intervals between two snapshots. Because of this, each WR-ASH data is not associated directly with a snapshot. Each data is associated with a timestamp that is tracked and understood by a control module, e.g., the ADDM.

In one aspect, moving of ASH data to disk occurs at the same time snapshots are taken.

Since, in one aspect, the ASH is implemented using a circular buffer in memory, data may need to be flushed to disk before they are overwritten. It is possible that the circular buffer is filled before a snapshot occurs. In such cases, a request will be made to the system to perform and emergency flushing of ASH data to free up space.

In one aspect, the WR snapshot data is purged periodically to avoid overuse of disk space, for example, based on a RETENTION setting controlled by users. The WR-ASH data is preferably purged based on the same retention scheme. For example, a nightly task might be performed to purge data from the Workload Repository.

In one aspect, ASH data is collected once every second. Thus, the amount of data for a 60-minute interval can take up as much as 60 MB on a busy system. Retaining such data for a month may require close to 10 GB of disk space. To reduce the amount of disk space usage, the in-memory data is filtered before flushing to disk using a time-based reduction scheme, e.g., a 10-to-1 reduction scheme.

U.S. Non-provisional application Ser. No. 10/775,733, entitled "Capturing Session Activity as In-Memory Snapshots Using a Time-Based Sampling Technique Within a Database for Performance Tuning and Problem Diagnosis", filed Feb. 9, 2004, discusses additional aspects of ASH and ASH statistics, and is hereby incorporated by reference in its entirety.

Snapshot Purging Policy

To make room for capturing new statistics, old snapshots are purged automatically and periodically in one aspect, e.g., every night. A background process runs a purge task in a predefined window of time, "the Management Window", if possible. The amount of historical statistics retained in the workload repository can be controlled by a retention setting. In one aspect, snapshots are removed automatically based on chronological order. Snapshots that belong to baselines are retained until their baselines are removed. Old data is deleted as snapshots are removed. When a shapshot is identified to be removed, the entire set of data belonging to the snapshot is preferably removed.

Metrics

In one aspect, the workload repository supports metrics, which are secondary statistics that are derived from base statistics. Examples of a base statistic are the number of reads performed on a particular database object and the number of user logons since the database was started up. Examples of metrics include a measure of the number of logons per second within a certain period and the average number of physical reads performed on a database object within the last 30 minute time period. Metrics are used frequently by internal clients to determine the health of the system, for early warning problem detection and self-tuning. Since such metrics are needed frequently, metrics for important activities (vital signs) are provided to the system. The number of buffer gets, number of transactions, and number of logons are examples of important metrics. In one aspect, metrics for commonly needed periods are computed automatically. For example, the time periods of 5 seconds, 15 seconds, and 60 seconds are a reasonable set of periods for computing metrics. Pre-computation of metrics allows internal clients to quickly compute the rate of change of database statistics.

Additional examples of metrics includes redo size per transaction, user calls per transaction, buffer cache hit ratio, and network traffic volume per second.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of defining a statistics baseline in a database system including a database, the method comprising:

storing, in a storage device associated with one or more computer systems in the database system, a plurality of snapshots to the database of the database system under evaluation captured by a workload repository module executed by one or more processors of the one or more computer systems as an internal process of the database system, each snapshot in the plurality of snapshots comprising a plurality of database performance statistics taken by the workload repository module at a specific point in time different in time from the other snapshots in the plurality of snapshots;

receiving, at the workload repository module, information indicative of a user defining a beginning time of one or more statistics baselines and information indicative of a user defining an end time of the one or more statistics baselines;

scheduling within the database system a baseline creation event which upon occurrence causes the workload repository module to automatically capture a first baseline based on the beginning time defined by the user for the one or more statistics baselines and the end time defined by the user for the one or more statistics baselines, the first baseline representing a set of database performance statistics over a time period in snapshots in the plurality of snapshots determined by the beginning time and the end time;

selecting within the database system a pair of snapshots from the plurality of snapshots upon occurrence of the baseline creation event based on the beginning time defined by the user for the one or more statistics baselines and the end time defined by the user for the one or more statistics baselines, wherein the pair of snapshots are automatically selected within the workload repository module based on the beginning time and the end time, wherein a first one of the pair of snapshots contains a same set of statistics types as a second one of the pair of snapshots, the first one of said snapshots having a first snapshot time and the second one of said snapshots having a second snapshot time, wherein the first one of the snapshots is selected by the workload repository module upon occurrence of the baseline creation event when the first snapshot time matches the beginning time and the second one of the snapshots is selected by the workload repository module upon occurrence of the baseline creation event when the second snapshot time matches the end time, said first baseline having a time period associated therewith, said time period being the difference between the first and second snapshot times; and storing, in the storage device associated with the one or more computer systems in the database system, a first baseline object associated with the first baseline to the database of the database system under evaluation using the workload repository module for comparison with a current set of statistics values, the first baseline object comprising a first identifier that identifies the first snapshot and a second identifier that identifies the second snapshot.

2. The method of claim 1, wherein the first baseline's time period is one of an hour, a day, a week, a month, a quarter and a year.

3. The method of claim 1, wherein snapshots are periodically purged by at least one computer system in the one or more computer systems from the database of the database system under evaluation according to a purging cycle, and wherein the first and second snapshots are not purged during the purging cycle.

4. The method of claim 1, further comprising determining within the database system a difference value for each of said plurality of statistics in the first snapshot and the second snapshot.

5. The method of claim 4, further comprising determining within the database system the current set of statistics values representing current database performance of said plurality of statistics over a time equal to the time period and comparing the current statistics values to the respective difference values.

6. The method of claim 1, further comprising determining within the database system a current set of one or more statistics values representing current database performance of one or more of said plurality of statistics over a time equal to the time period and comparing the current statistics values to the respective difference values.

7. The method of claim 6, wherein if the result of comparing the one or more current statistic values within the database system to the respective difference values from the first baseline exceeds a threshold value, automatically generating a system alert within at least one computer system in the one or more computer systems.

8. The method of claim 1, wherein receiving, at the workload repository module, information indicative of a user defining a beginning time of one or more statistics baselines and information indicative of a user defining an end time of the one or more statistics baselines further comprises receiving a user-provided selection of the first and second snapshots.

9. The method of claim 1, further comprising:
receiving, at the workload repository module, a selection of a pair of said two or more snapshots, wherein at least one of said pair is different from said first and second snapshots, wherein said pair of snapshots define a second baseline; and
storing, in the storage device associated with the one or more computer systems in the database system, a second baseline object associated with the second baseline to the database of the database system under evaluation using the workload repository module, the second baseline object including a pair of identifiers that identify the pair of snapshots, said second baseline having a time period associated therewith equal to the difference between the snapshot times associated with said pair of snapshots.

10. The method of claim 9, wherein the time period of the second baseline is different than the time period of the first baseline.

11. The method of claim 9, wherein the time period of the second baseline is the same as the time period of the first baseline.

12. A computer program product stored on a computer-readable storage medium configured to store code operational by a processor of a computer system for defining a statistics baseline in a database system including a database, the computer program product comprising:
code for storing a plurality of snapshots to the database of the database system under evaluation captured by a workload repository module executed by the computer system as an internal process of the database system, each snapshot in the plurality of snapshots comprising a plurality of database performance statistics taken by the workload repository module at a specific point in time different in time from the other snapshots in the plurality of snapshots;
code for receiving, at the workload repository module, information indicative of a user defining a beginning time of one or more statistics baselines and information indicative of a user defining an end time of the one or more statistics baselines;
code for scheduling a baseline creation event which upon occurrence causes the workload repository module to automatically capture a first baseline based on the beginning time defined by the user for the one or more statistics baselines and the end time defined by the user for the one or more statistics baselines, the first baseline representing a set of database performance statistics over a time period determined by the beginning time and the end time;
code for selecting a pair of snapshots from the plurality of snapshots upon occurrence of the baseline creation event based on the beginning time defined by the user for the one or more statistics baselines and the end time defined by the user for the one or more statistics baselines, wherein the pair of snapshots are automatically selected within the workload repository module based on the beginning time and the end time, wherein a first one of the pair of snapshots contains a same set of statistics types as a second one of the pair of snapshots, the first one of said snapshots having a first snapshot time and the second one of said snapshots having a second snapshot time, wherein the first one of the snapshots is selected by the workload repository module upon occurrence of the baseline creation event when the first snapshot time matches the beginning time and the second one of the snapshots is selected by the workload repository module upon occurrence of the baseline creation event when the second snapshot time matches the end time, said first baseline having a time period associated therewith, said time period being the difference between the first and second snapshot times; and
code for storing a first baseline object associated with the first baseline to the database of the database system under evaluation using the workload repository module for comparison with a current set of statistics values, the first baseline object comprising a first identifier that identifies the first snapshot and a second identifier that identifies the second snapshot.

13. The computer program product of claim 12, wherein the first baseline's time period is one of an hour, a day, a week, a month, a quarter and a year.

14. The computer program product of claim 12, wherein snapshots are periodically purged from the database according to a purging cycle, and wherein the first and second snapshots are not purged during the purging cycle.

15. The computer program product of claim 12, further comprising code for determining a difference value for each of said plurality of statistics in the first snapshot and the second snapshot.

16. The computer program product of claim 15, further comprising code for determining the current set of statistics values representing current database performance of said plurality of statistics over a time equal to the time period and comparing the current statistics values to the respective difference values.

17. The computer program product of claim 12, further comprising code for determining a current set of one or more statistics values representing current database performance of one or more of said plurality of statistics over a time equal to the time period and comparing the current statistics values to the respective difference values.

18. The computer program product of claim 17, further comprising code for automatically generating a system alert if the result of comparing the one or more current statistic values to the respective difference values from the first baseline exceeds a threshold value.

19. The computer program product of claim 17, further comprising:
code for receiving a selection of a pair of said two or more snapshots, wherein at least one of said pair is different from said first and second snapshots, wherein said pair of snapshots define a second baseline; and
code for storing a second baseline object associated with the second baseline to the database of the database system under evaluation using the workload repository module, the second baseline object including a pair of identifiers that identify the pair of snapshots, said second baseline having a time period associated therewith equal to the difference between the snapshot times associated with said pair of snapshots.

20. A database system, comprising:
a database for storing data objects;
one or more computer systems configured to provide a process space used by one or more processors of the one or more computer systems;
a database management process executing in the process space, the management process configured to access the data objects responsive to client requests; and
a system process executing in the process space as an internal process, the system process configured to:
store a plurality of snapshots to the database, each snapshot in the plurality of snapshots comprising a plurality of database performance statistics taken by the system process at a specific point in time different in time from the other snapshots in the plurality of snapshots;
receive information indicative of a user defining a beginning time of one or more statistics baselines and information indicative of a user defining an end time of the one or more statistics baselines;
schedule a baseline creation event which upon occurrence causes the system process to automatically capture a first baseline based on the beginning time defined by the user for the one or more statistics baselines and the end time defined by the user for the one or more statistics baselines, the first baseline representing a set of database performance statistics over a time period determined by the beginning time and the end time;
select a pair of snapshots from the plurality of snapshots upon occurrence of the baseline creation event based on the beginning time defined by the user for the one or more statistics baselines and the end time defined by the user for the one or more statistics baselines, wherein the pair of snapshots are automatically selected based on the beginning time and the end time, wherein a first one of the pair of snapshots contains a same set of statistics as a second one of the pair of snapshots, the first one of said snapshots having a first snapshot time and the second one of said snapshots having a second snapshot time, wherein the first one of the snapshots is selected by the system process when the first snapshot time matches the beginning time and the second one of the snapshots is selected by the system process when the second snapshot time matches the end time, said first baseline having a time period associated therewith, said time period being the difference between the first and second snapshot times; and
store a first baseline object associated with the first baseline to the database for comparison with a current set of statistics values, the first baseline object comprising a first identifier that identifies the first snapshot and a second identifier that identifies the second snapshot.

21. The database system of claim 20, wherein the system process is further configured to determine a difference value for each of said plurality of statistics in the first snapshot and the second snapshot.

22. The database system of claim 21, wherein the system process is further configured to determine the current set of statistics values representing current database performance of said plurality of statistics over a time equal to the time period and comparing the current statistics values to the respective difference values.

23. The database system of claim 20, wherein the system process is further configured to determine a current set of one or more statistics values representing current database performance of one or more of said plurality of statistics over a time equal to the time period and comparing the current statistics values to the respective difference values.

24. The database system of claim 23, wherein the system process is further configured to automatically generate a system alert if the result of comparing the one or more current statistic values to the respective difference values from the first baseline exceeds a threshold value.

25. The database system of claim 20, wherein the system process is further configured to:
receive a selection of a pair of said two or more snapshots, wherein at least one of said pair is different from said first and second snapshots, wherein said pair of snapshots define a second baseline; and
store a second baseline object associated with the second baseline to the database, the second baseline object including a pair of identifiers that identify the pair of snapshots, said second baseline having a time period associated therewith equal to the difference between the snapshot times associated with said pair of snapshots.

* * * * *

UNITED STATES PATENT AND TRADEMARK OFFICE
CERTIFICATE OF CORRECTION

PATENT NO. : 7,664,798 B2  Page 1 of 1
APPLICATION NO. : 10/934345
DATED : February 16, 2010
INVENTOR(S) : Graham Stephen Wood et al.

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 448 days.

Delete the phrase "by 448 days" and insert -- by 552 days --.

On the title page, item (56), in column 2, under "U.S.Patent Documents", line 3, delete "Amalifitano" and insert -- Amalfitano --, therefor.

In the drawings:

On sheet 2 of 2, in Figure 2, box 110, line 1, delete "Metadate" and insert -- Metadata --, therefor.

On sheet 2 of 2, in Figure 2, box 110, line 3, delete "snap-id" and insert -- snap_id --, therefor.

In column 6, line 62, delete "snaphot_id," and insert -- snapshot_id, --, therefor.

In column 7, line 37, after "snapshots" insert -- . --.

In column 10, line 15, delete "TopN" and insert -- Top N --, therefor.

In column 10, line 37, delete "shapshots" and insert -- snapshots --, therefor.

In column 11, line 16, delete "shapshot" and insert -- snapshot --, therefor.

Signed and Sealed this

Fourteenth Day of September, 2010

David J. Kappos
*Director of the United States Patent and Trademark Office*